US012718840B2

(12) United States Patent
Chakravarty et al.

(10) Patent No.: US 12,718,840 B2
(45) Date of Patent: Aug. 25, 2026

(54) OPTICAL SIGNAL TRANSMISSION IN A HARD DISK DRIVE

(71) Applicant: Seagate Technology LLC, Fremont, CA (US)

(72) Inventors: Barish Chakravarty, Shugart (SG); Mark Anthony Gubbins, Springtown (GB); Xiong Liu, Shugart (SG); John Kwong Heng Alphonsus Kwok, Shugart (SG); Zi Jian Brandon Ang, Shugart (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/969,693

(22) Filed: Dec. 5, 2024

(65) Prior Publication Data

US 2025/0201269 A1 Jun. 19, 2025

Related U.S. Application Data

(60) Provisional application No. 63/609,407, filed on Dec. 13, 2023.

(51) Int. Cl.

*G11B 5/48* (2006.01)
*G11B 5/012* (2006.01)
*G11B 5/55* (2006.01)
*G11B 25/04* (2006.01)

(52) U.S. Cl.

CPC ............ *G11B 5/4866* (2013.01); *G11B 5/012* (2013.01); *G11B 5/4813* (2013.01); *G11B 5/4833* (2013.01); *G11B 5/5521* (2013.01); *G11B 25/043* (2013.01)

(58) Field of Classification Search

None

See application file for complete search history.

(56) References Cited

U.S. PATENT DOCUMENTS

| | | | | |
|---|---|---|---|---|
| 6,252,743 | B1 * | 6/2001 | Bozorgi | G11B 5/484 360/264.2 |
| 11,348,611 | B1 | 5/2022 | Mendonsa et al. | |
| 11,410,698 | B1 * | 8/2022 | Gubbins | G11B 13/04 |
| 11,468,909 | B1 | 10/2022 | Liang et al. | |
| 11,488,624 | B1 | 11/2022 | Liu et al. | |
| 2002/0097520 | A1 * | 7/2002 | Bower et al. | G11B 5/5526 360/78.12 |
| 2010/0195473 | A1 * | 8/2010 | Tsuyama | G11B 5/4866 398/79 |
| 2022/0301595 | A1 * | 9/2022 | Okano et al. | G11B 25/043 |
| 2023/0005504 | A1 * | 1/2023 | Gomez et al. | G11B 13/045 |

* cited by examiner

*Primary Examiner* — Craig A. Renner
(74) *Attorney, Agent, or Firm* — Mueting Raasch Group

(57) ABSTRACT

Disclosed are methods and assemblies used to optically communicate signals within a hard disk drive between controller electronics and recording heads. One or more transceivers in a fixed location can be used to communicate with one or more transceivers positioned on a moveable actuator and coupled to the recording heads. The use of linear motion actuators can help preserve line-of-sight optical communication between the transceivers.

16 Claims, 3 Drawing Sheets

OPTICAL SIGNAL TRANSMISSION IN A HARD DISK DRIVE

CROSS REFERENCE TO RELATED APPLICATIONS

This application claims the benefit of 63/609,407, filed Dec. 13, 2023, the disclosure of which is incorporated by reference herein in its entirety.

TECHNICAL FIELD

The present disclosure generally relates to transmitting signals between read/write heads and controller electronics within hard disk drives.

SUMMARY

Methods and devices of the present disclosure generally relate to the use of optical communication within a hard disk drive.

In certain aspects, the present disclosure provides hard disk drives that include an actuator arm configured to move a recording head relative to a spinning magnetic disk to thereby read data from and write data to the magnetic disk, a preamp attached to the actuator arm, the preamp configured to prepare data read from or to be written to the magnetic disk, controller electronics configured to transmit host-readable data to and from the preamp, and first and second optical transceivers configured for communicating data between the preamp and the controller electronics, the first optical transceiver being attached to the actuator arm and the second optical transceiver positioned off of the actuator arm.

In certain aspects, the actuator arm is configured to move translationally back and forth along a single linear axis.

In certain aspects, the preamp includes a photovoltaic cell to power the preamp using incident light from a light source such as a laser or LED.

In certain aspects, the first and second optical transceivers are positioned to be in mutual direct line-of-sight.

In certain aspects, the second optical transceiver is adjustable to maintain line-of-sight alignment with the first optical transceiver.

In certain aspects, the disk drive has an actuator assembly including multiple actuator arms interleaved with multiple magnetic recording disks so that each surface of the magnetic disks is associated with a recording head. One or more optical transceivers can be attached to the actuator assembly and associated with the recording heads either in a one-to-one or one-to-many configuration. Similarly, one or more optical transceivers can be provided in a fixed position off of the actuator assembly in a one-to-one or one-to-many configuration with the recording heads or with the optical transceivers on the actuator assembly. In various configurations, collimator lenses may be used with either set of optical transceivers to collimate and align optical signals.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
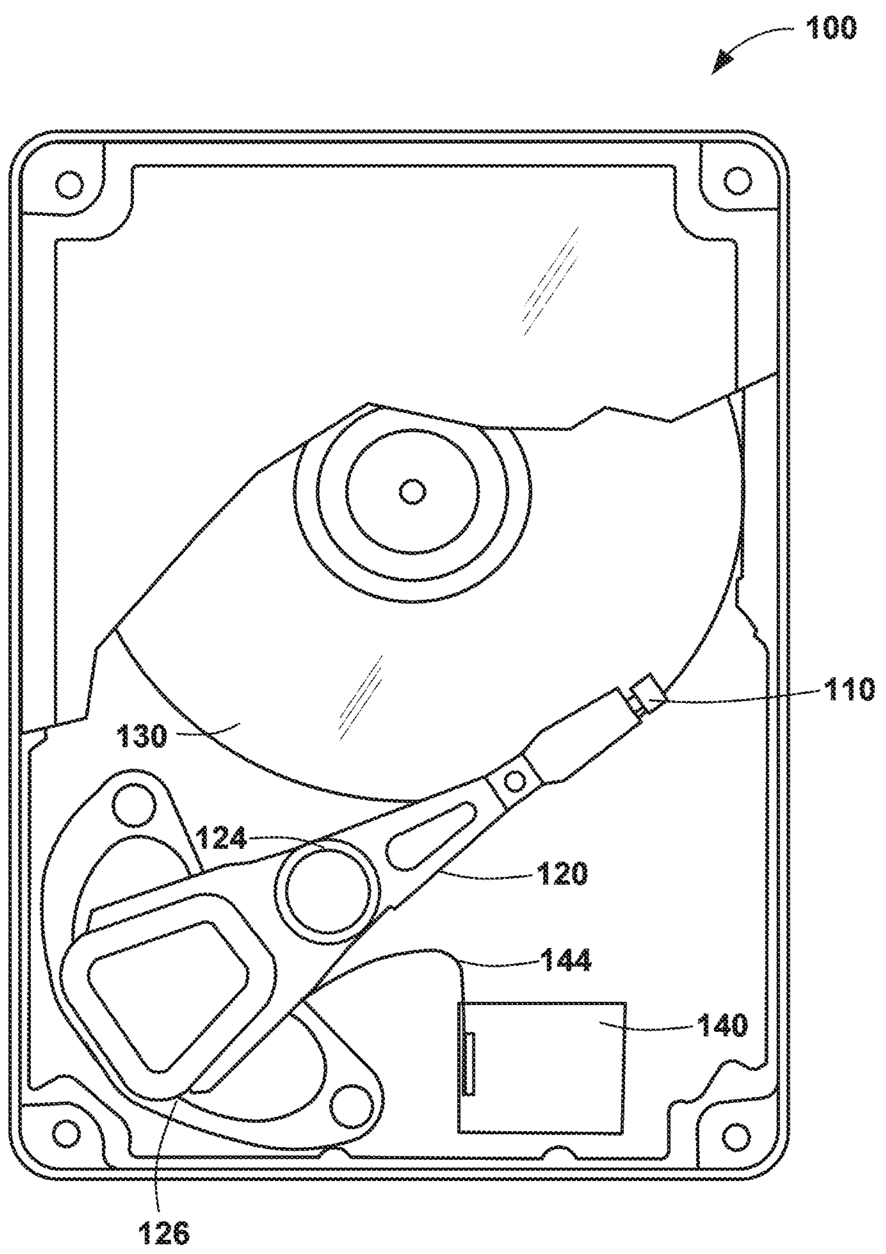
FIG. 1 is a schematic representation of internal components of a typical hard disk drive.

The present disclosure generally provides methods and arrangements for optical communication of signals within a hard disk drive. A hard disk drive includes magnetic recording media provided on a spinning disk. A recording head (also referred to herein as a read/write head) is positioned at or near the end of an actuator arm and suspended in close proximity to the magnetic recording media in order to write bits to and read bits from the magnetic recording media. The movement of the actuator arm positions the recording head relative to data tracks on the spinning media disk. In many configurations, the actuator arm is moved by rotating around a pivot point, thereby moving in an arc relative to the spinning media. In other configurations, the actuator arm is moved linearly, for example back and forth along a fixed track. Linear actuator mechanisms for hard disk drives include those described in U.S. Pat. No. 11,488,624, the disclosure of which is incorporated herein in its entirety.

In a typical hard disk drive, data is transmitted to and from the recording head via a flex circuit leading from controller electronics to the rotatable actuator, and then to the recording head via additional circuitry or wires, such as a trace gimbal assembly (TGA) built on the actuator in the form of a suspension. A preamp is located in the signal path to condition the data received from the controller for writing onto the magnetic recording media, and to condition the data read from the magnetic recording media so that it can be processed by the controller electronics and communicated to a host device.

In accordance with various aspects of the present disclosure, the data transmission path between the controller electronics and the recording heads includes an optical communication path between an optical transceiver located on the actuator arm and an optical transceiver in a fixed (or fixable) position off of the actuator arm. For example, on an actuator arm that includes a recording head mounted on a slider positioned near the end portion of the actuator arm, a photonic transceiver can be located on the slider near the recording head and connected to a preamp integrated with the slider. A paired photonic transceiver that is coupled to the controller electronics can be positioned so that it can optically communicate with the photonic transceiver positioned on the actuator arm.

In certain aspects, the actuator (or actuator body) is moved using a linear rail so that the actuator arm, and thus the slider, moves along a straight line rather than in an arc. This linear motion can help maintain line-of-sight communication between the transceivers when the motion of the actuator is parallel to the line-of-sight. Other actuator movement configurations can be employed, provided that alignment between pairs of optical transceivers can be maintained. For example, U.S. Pat. No. 11,468,909, which is incorporated by reference herein in its entirety, describes zero-skew actuator configurations that may be useful in configurations in accordance with the present disclosure.

Using optical signal communication between the controller electronics and the recording heads in accordance with the present disclosure can greatly reduce or eliminate the use of flex circuits and TGAs. This can simplify assembly processes and produce better signal to noise ratios (SNR) between the preamp and the controller. Receiving and transmitting data using an optical transceiver near the recording head can help mitigate or eliminate the electromagnetic interference and noise that is present in designs that transmit signals using wires, traces, or cables between the recording head and a printed circuit board attached to the actuator assembly.

It will be appreciated that various aspects of the present disclosure may be implemented in disk drive systems that include multiple (typically stacked) recording media disks, multiple recording heads whether provided as a single recording head per recording media surface, multiple recording heads per recording media surface, or in a configuration such as with an elevator-style actuator arm where there are fewer recording heads per recording media surface (such as the system disclosed in U.S. Pat. No. 11,348,611, which is incorporated by reference herein in its entirety).

As used herein, the term "or" refers to an inclusive definition, for example, to mean "and/or" unless its context of usage clearly dictates otherwise. The term "and/or" refers to one or all of the listed elements or a combination of at least two of the listed elements.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

FIG. 1 depicts working components of a typical hard drive 100 such as may be found in the art. A slider 110 is attached to the end of an actuator arm 120 that rotates around a pivot 124 by use of a voice coil motor (VCM) 126 that includes a voice coil and a magnet (not separately identified in FIG. 1). The slider 110 includes components such as a recording head, or read/write head, that are suspended on an air bearing over spinning magnetic media disk 130. The VCM 126, recording head, magnetic media disk motor, and other electronic components may be controlled by signals received from controller electronics 140, or may be controlled by electronics provided on a printed circuit board assembly (PCBA) disposed near the component. For example, flex circuit 144 carries signals between the controller electronics and components provided on the actuator, such as the VCM and recording head, and connects to a PCBA provided on the actuator. The flex circuit 144 accommodates the range of motion necessary for the actuator arm 120 and slider 110 to traverse the recording surface of the magnetic media 130.

Figure 2:
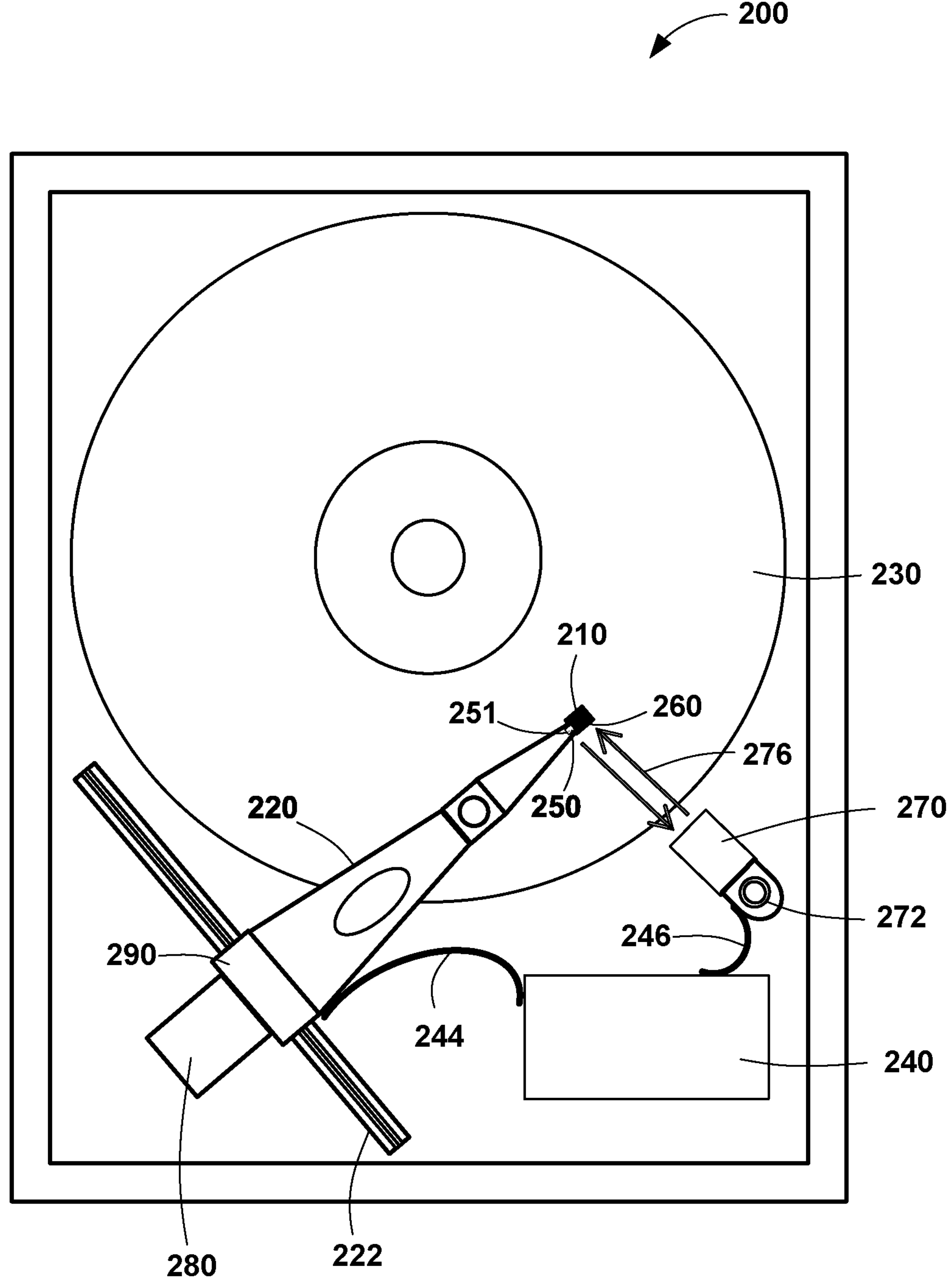
FIG. 2 is a schematic representation of a hard disk drive in accordance with various aspects of the present disclosure.

FIG. 2 schematically shows a hard disk drive 200 in accordance with certain aspects of the present invention. The disk drive 200 employs the use of an optical transceiver 270 coupled to controller electronics 240 to communicate signals 276 with an optical transceiver 260 positioned near the recording head 210, for example on the slider. In this embodiment, actuator arm 220 traverses the surface of magnetic recording media disk 230 by use of a linear rail system 222. A motor such as motor 280 is coupled to the actuator body 290 that is in turn coupled to the rail system 222. Motor 280 can be any suitable motor such as a voice coil motor (VCM) or ultrasonic motor (USM). Optical transceivers 260 and 270 are positioned and aligned such that the direction of propagation of optical signals 276 is substantially parallel to the linear motion direction of actuator arm 220. Such linear motion helps maintain line-of-sight between the optical transceivers 260 and 270.

Upon assembly of disk drive 200, optical transceiver 270 can be aligned and then set in a fixed position. Alternatively, optical transceiver 270 can be mounted to a pivot 272 or translational actuator so that its alignment can be adjusted to maintain direct line-of-sight with the optical transceiver 260 located on the actuator arm 220 near the recording head 210. Alignment can be facilitated using lasers and photodetectors, for example.

Optical transceiver 270, along with any actuation devices for adjusting the position of optical transceiver 270, can be coupled to controller electronics 240 in any suitable fashion, such as the use of a flex circuit 246. In addition, linear rail system 222 can be controlled from electronics provided on a PCBA that is communicatively coupled to the controller electronics 240 via flex circuit 244.

A preamp 250 may be communicatively coupled to optical transceiver 260, for example positioned on the slider near recording head 210 and transceiver 260. The preamp 250 conditions signals received from the controller 240 and transmitted via optical signal communication from transceiver 270 to transceiver 260 so that such signals can be written as data bits on recording media 230 using recording head 210. Preamp 250 also conditions signals received from the read portion of the recording head 210 when data is read from the magnetic media 230 so that those signals can be relayed back to the controller electronics 240 via optical communication from transceiver 260 to transceiver 270.

Since the signals for controlling the preamp 250 and recording head 210 can be provided via optical communication between transceivers 260 and 270, the only wired connection that may be needed from flex circuit 244 to the preamp 250, transceiver 260, and recording head 210 is to provide power. Power may be provided by a separate wire or by a TGA trace on the actuator arm 220 leading to the slider at the end of the actuator. In certain embodiments, power can also be transmitted optically by using a photocell 251, for example as part of the optical transceiver 260 or as part of preamp 250 positioned at or near recording head 210. A light source, such as a laser or LED, for example provided as part of transceiver assembly 270, may be dedicated to illuminating a photocell to provide one or more components on the slider with power.

While the hard drive in FIG. 2 is schematically shown to include a slider on the end of an actuator arm that connects to a rail and motor assembly located to the side of the recording disks, it will be appreciated that other arrangements are possible. For example, a rail system could extend over the recording disks with one or more sliders connected to the rail system so that the one or more sliders move on the rail system, instead of using an extended actuator arm. In such a configuration, the attachment between the slider and the rail system, or the slider itself, can be considered an actuator arm in the sense that it is what imparts motion to the recording head.

Figure 3:
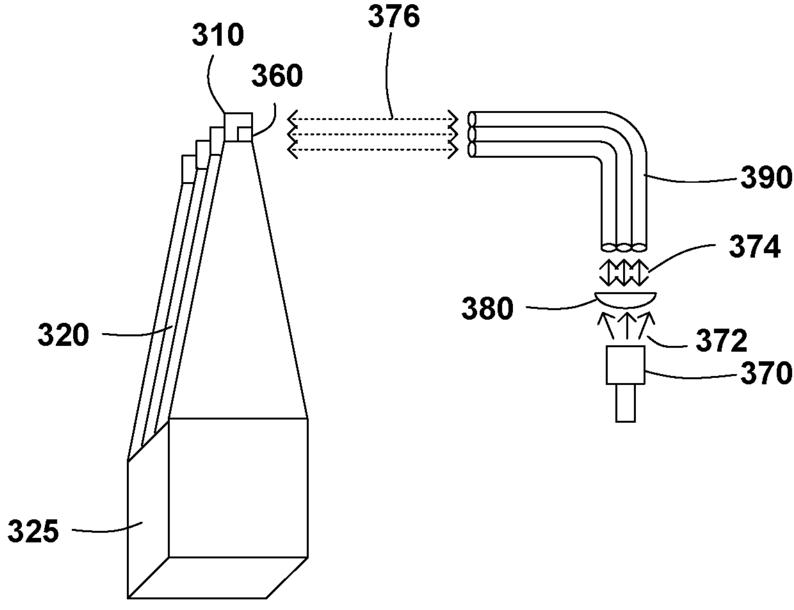
FIG. 3 is a schematic representation of an optical transceiver arrangement in accordance with certain aspects of the present disclosure.

FIG. 3 schematically shows an optical transceiver arrangement that utilizes a collimator lens 380 and light guides 390, for example fiber optics or other total internal reflection waveguides. Such an arrangement may provide flexibility in positioning of transceiver 370. As shown, an optical transceiver 370 is emitting optical signals 372. The optical signals 372 are collimated using lens 380 to form a collimated optical signal array 374 that can be received into light guides 390, and to focus light onto transceiver 370 when signals are received from the recording head. Optical signals are guided by light guides 390 to a point where the signals 376 can be transmitted in a direct line-of-sight to optical transceiver 360. As shown, optical transceiver 360 is positioned near recording head 310 at the end of actuator arm 320. In many hard disk drives, several actuator arms are attached to a single actuator body 325 so that multiple recording heads can each interact with the recording surface of an adjacent magnetic media disk. In the configuration shown in FIG. 3, each separate recording head may be associated with a separate optical transceiver. It will be appreciated that configurations may be employed in which a single optical transceiver disposed on an actuator arm or on an actuator body can be used to communicate signals to and from multiple recording heads.

To save space within the hard drive enclosure, light guides 390 can be designed into a ramp located to the side of the magnetic media disks that is normally used to "park" the actuator in situations where the hard drive is not active or it is otherwise desirable to prevent head crashes on the magnetic media. For example, optical material could be used for the ramp design to thereby direct or reflect light to and from the transceiver located near the recording head.

The use of collimator lens 380 to focus the light onto transceiver 370 can help reduce the required number of light transceivers on the fixed end. For example, instead of having multiple separate transceivers, one to interact with each head assembly, a single transceiver 370 can be used to communicate with multiple head assemblies, or even with all head assemblies.

Figure 4:
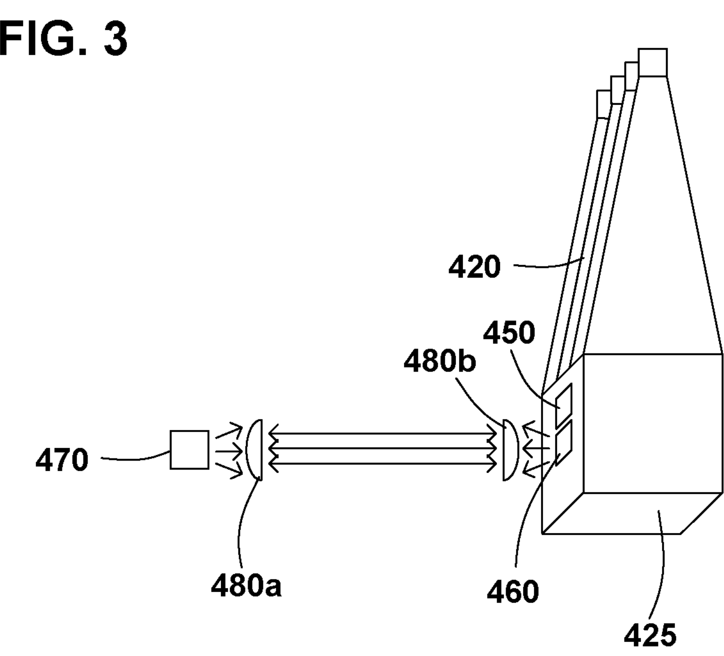
FIG. 4 is a schematic representation of an optical transceiver arrangement in accordance with certain aspects of the present disclosure.

FIG. 4 schematically shows a configuration in which an optical transceiver 460 communicates signals to and from multiple recording heads. As shown, transceiver 470 communicates optical signals with transceiver 460, for example in light-of-sight fashion. Collimating lenses 480*a* and 480*b* may be used to focus signals on the transceivers and to collimate the signal packets received from the transceivers. Transceiver 460 may be located on an actuator body 425 to which multiple actuator arms are attached, such as actuator arms 420. One or more preamps 450 may also be attached to the actuator body 425

While the configuration shown in FIG. 4 may still require wiring such as a TGA to communicate to the recording head, it can greatly reduce the number of optical transceivers. For example, in a hard drive that includes 5 magnetic media disks and thus 10 recording surfaces, configurations using separate optical transceiver pairs for each recording head would require 20 optical transceivers. Using a collimating lens on the fixed end transceivers (such as shown in FIG. 3), can reduce the number of fixed end transceivers from 10 down to 1. Using a collimating lens on the side with the actuator transceiver can likewise reduce the number of actuator transceivers from 10 down to 1. As such, depending on design choice, cost, and tradeoffs, a 5-disk hard drive could utilize any number of optical transceivers from 2 to 20.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

All scientific and technical terms used herein have meanings commonly used in the art unless otherwise specified. The definitions provided herein are to facilitate understanding of certain terms used frequently herein and are not meant to limit the scope of the present disclosure.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality. For example, a controller may be operably coupled to a resistive heating element to allow the controller to provide an electrical current to the heating element.

As used herein, any term related to position or orientation, such as "proximal," "distal," "end," "outer," "inner," and the like, refers to a relative position and does not limit the absolute orientation of an embodiment unless its context of usage clearly dictates otherwise.

As used herein, the term "configured to" may be used interchangeably with the terms "adapted to" or "structured to" unless the content of this disclosure clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A hard disk drive comprising:

an actuator assembly including actuator arm attached to an actuator body, the actuator arm configured to move a recording head relative to a spinning magnetic disk to thereby read data from and write data to the magnetic disk;

a preamp attached to the actuator arm, the preamp configured to prepare data read from or to be written to the magnetic disk;

controller electronics configured to transmit host-readable data to and from the preamp;

first and second optical transceivers configured to form an optical communication path for data between the preamp and the controller electronics, the first optical transceiver being attached to the actuator assembly and the second optical transceiver positioned off of the actuator assembly; and a collimator lens disposed to collimate optical signals sent from the first or second optical transceivers.

2. The hard disk drive of claim 1, wherein the actuator arm is configured to move translationally back and forth along a single linear axis.

3. The hard disk drive of claim 1, wherein the preamp includes a photovoltaic cell such that the preamp is powered by light being incident on the photovoltaic cell.

4. The hard disk drive of claim 1, wherein the first and second optical transceivers are positioned to be in mutual direct line-of-sight.

5. The hard disk drive of claim 1, wherein at least one of the optical transceivers includes fiber optics disposed to emit and receive light.

6. The hard disk drive of claim 1, wherein the second optical transceiver is in fixed position.

7. The hard disk drive of claim 1, wherein the second optical transceiver has a position that is adjustable to maintain line-of-sight alignment with the first optical transceiver.

8. The hard disk drive of claim 1, wherein the first optical transceiver is positioned at or near the recording head.

9. The hard disk drive of claim 1, wherein the first optical transceiver is positioned at or near the actuator body.

10. The hard disk drive of claim 1, wherein the preamp is positioned at or near the recording head.

11. A hard disk drive comprising:

an actuator assembly comprising multiple actuator arms interleaved with multiple spaced apart spinning magnetic disks, each actuator arm configured to move an associated recording head relative to a proximal surface of one of the spinning magnetic disks to thereby read data from and write data to said proximal surface;

one or more preamps attached to the actuator assembly, the one or more preamps configured to prepare data read from or to be written to one or more of the magnetic disks;

controller electronics configured to transmit host-readable data to and from the one or more preamps;

one or more first optical transceivers attached to the actuator assembly;

one or more second optical transceivers positioned in a fixed location off of the actuator assembly; and a first collimator lens disposed to collimate optical signals sent from the one or more first optical transceivers or a second collimator lens disposed to collimate optical signals sent from the one or more second optical transceivers, wherein the one or more first optical transceivers and one or more second optical transceivers are configured to form one or more optical communication paths for data between the one or more preamps and the controller electronics.

12. The hard disk drive of claim 11, wherein the number of first optical transceivers is less than the number of recording heads.

13. The hard disk drive of claim 11, wherein the number of second optical transceivers is less than the number of recording heads.

14. The hard disk drive of claim 11, comprising both of the first collimator lens and the second collimator lens.

15. The hard disk drive of claim 14, wherein the number of first optical transceivers and the number of second optical transceivers are both less than the number of recording heads.

16. The hard disk drive of claim 15, wherein the number of first optical transceivers is one, and the number of second optical transceivers is one.

* * * * *